US008885279B1

(12) United States Patent
Kermiche et al.

(10) Patent No.: US 8,885,279 B1
(45) Date of Patent: Nov. 11, 2014

(54) DISK DRIVE DETECTING HEAD/DISK CONTACT BY EVALUATING A SUBSET OF TOUCHDOWN METRICS DURING A SERVO SECTOR INTERRUPT

(75) Inventors: Noureddine Kermiche, Mission Viejo, CA (US); Scott A. St. John, Trabuco Canyon, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 824 days.

(21) Appl. No.: 13/158,208

(22) Filed: Jun. 10, 2011

Related U.S. Application Data

(60) Provisional application No. 61/378,293, filed on Aug. 30, 2010.

(51) Int. Cl.
*G11B 5/60* (2006.01)

(52) U.S. Cl.
CPC ................................ *G11B 5/6076* (2013.01)
USPC .............................................. 360/55; 360/75

(58) Field of Classification Search
None
See application file for complete search history.

(56) References Cited

U.S. PATENT DOCUMENTS

| 5,377,058 | A | 12/1994 | Good et al. |
| 6,501,606 | B2 | 12/2002 | Boutaghou et al. |
| 7,038,875 | B2 | 5/2006 | Lou et al. |
| 7,068,449 | B2 | 6/2006 | Riddering et al. |
| 7,068,451 | B1 | 6/2006 | Wang et al. |
| 7,158,325 | B1 | 1/2007 | Hu et al. |
| 7,265,933 | B1 | 9/2007 | Phan et al. |
| 7,324,299 | B1 | 1/2008 | Schreck et al. |
| 7,330,324 | B2 | 2/2008 | Morinaga et al. |
| 7,362,534 | B1 * | 4/2008 | Schreck et al. ................. 360/75 |
| 7,369,340 | B1 | 5/2008 | Dang et al. |
| 7,423,830 | B2 | 9/2008 | Ma et al. |
| 7,426,090 | B2 | 9/2008 | Yamashita et al. |
| 7,505,222 | B2 | 3/2009 | Ryu |
| 7,508,618 | B1 * | 3/2009 | Herbst et al. .................... 360/75 |
| 7,518,813 | B1 | 4/2009 | Egan et al. |
| 7,583,466 | B2 * | 9/2009 | Kermiche et al. ............... 360/75 |
| 7,990,641 | B2 * | 8/2011 | Tomita ........................... 360/75 |
| 8,730,611 | B2 * | 5/2014 | Liu et al. ......................... 360/75 |
| 2003/0043491 | A1 | 3/2003 | Riddering et al. |
| 2007/0268615 | A1 | 11/2007 | McFadyen et al. |
| 2008/0130159 | A1 | 6/2008 | Dieron et al. |
| 2008/0165443 | A1 | 7/2008 | Moline |
| 2008/0165446 | A1 | 7/2008 | Partee |
| 2010/0321812 | A1 * | 12/2010 | Tomita ........................... 360/31 |
| 2011/0255189 | A1 * | 10/2011 | Shibano et al. ................. 360/75 |
| 2012/0050907 | A1 * | 3/2012 | Haapala .......................... 360/59 |

* cited by examiner

*Primary Examiner* — Wayne Young
*Assistant Examiner* — James L Habermehl

(57) ABSTRACT

A disk drive is disclosed comprising a head actuated over a disk comprising a plurality of tracks, wherein each track comprises a plurality of servo sectors. The head is positioned over a first track, and when a first servo sector is processed, a first touchdown metric is evaluated to detect whether the head contacted the disk without evaluating a second touchdown metric. When a second servo sector is processed, the second touchdown metric is evaluated to detect whether the head contacted the disk without evaluating the first touchdown metric.

20 Claims, 6 Drawing Sheets

```
if ( RealTimeTDVars.RealTimeTDFlag ) {
    int j;
    INT32 Local_Diffs[REALTIME_TD_TERMS];
    INT32 Local_ABCDSum;
    INT32 variance;

//Metrics calculations
    Local_Diffs[0] = PosErr + PosErr2Old - 2 * PosErrOld ; // acceleration
    Local_ABCDSum = svoData.burstA + svoData.burstB + svoData.burstC + svoData.burstD;
    Local_Diffs[1] = Local_ABCDSum - RealTimeTDVars.ABCD_Z1; // servo burst amplitude
    RealTimeTDVars.ABCD_Z1 = Local_ABCDSum;
    Local_Diffs[2] = (WTWTppm - RealTimeTDVars.DSW_Z1); // wedge-to-wedge timing
    RealTimeTDVars.DSW_Z1 = WTWTppm;

// Variance is computed continuously
    for (j = REALTIME_TD_TERMS - 1; j >= 0; j--)
        RealTimeTDVars.Global_Diffs[j] += Local_Diffs[j]*Local_Diffs[j];

// Low pass filter and touchdown decisions are done on each metric every 3rd wedge to reduce ISR time.
    j = SecNum % REALTIME_TD_TERMS;
    variance = RealTimeTDVars.Global_Diffs[j];
    RealTimeTDVars.Global_Diffs[j] = 0;
    if(RealTimeTDVars.RealTimeTDThreshFlag) // Detection path
        RealTimeTDVars.Corr_Diffs[j] = variance + ((( RealTimeTDVars.Corr_Diffs[j] - variance ) * RealTimeTDVars.Rate[j]) >> 8);

if ( RealTimeTDVars.Corr_Diffs[j] > RealTimeTDVars.Thresholds[j] )
        RealTimeTDVars.Counters[j]++;
        if(RealTimeTDVars.Counters[j] > REALTIME_TD_CONSECUTIVE_DETECTIONS)
            RealTimeTDVars.Counters[j] = REALTIME_TD_CONSECUTIVE_DETECTIONS + 1;
            IncSviCnt( &SviCnt.a.RealTime_TD_Detection[j]);
        else
            RealTimeTDVars.Counters[j] = 0;

else
        if(variance > RealTimeTDVars.Corr_Diffs[j]) // Calibration path
            RealTimeTDVars.Corr_Diffs[j] = variance + ((( RealTimeTDVars.Corr_Diffs[j] - variance ) * RealTimeTDVars.Rate[j]) >> 8);
```

FIG. 6

DISK DRIVE DETECTING HEAD/DISK CONTACT BY EVALUATING A SUBSET OF TOUCHDOWN METRICS DURING A SERVO SECTOR INTERRUPT

CROSS-REFERENCE TO RELATED APPLICATIONS

The present application claims priority from provisional U.S. Patent Application Ser. No. 61/378,293, filed on Aug. 30, 2010, the specification of which is incorporated herein by reference.

BACKGROUND

Description of the Related Art

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

FIG. 1 shows a prior art disk format 2 comprising a number of data tracks 4 defined by concentric servo sectors $6_0$-$6_N$ recorded around the circumference of each data track. Each servo sector $6_i$ comprises a preamble 8 for storing a periodic pattern, which allows proper gain adjustment and timing synchronization of the read signal, and a sync mark 10 for storing a special pattern used to synchronize to a servo data field 12. The servo data field 12 stores coarse head positioning information, such as a servo track address, used to position the head over a target data track during a seek operation. Each servo sector $6_i$ further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

An air bearing forms between the head and the disk due to the disk rotating at high speeds. Since the quality of the write/read signal depends on the fly height of the head, conventional heads (e.g., a magnetoresistive heads) may comprise an actuator for controlling the fly height. Any suitable fly height actuator may be employed, such as a heater which controls fly height through thermal expansion, or a piezoelectric (PZT) actuator. If the operating conditions change, such as the temperature changing or a fly height calibration track degrading, the calibrated fly height control may cause the head to contact the disk during normal operation. Accordingly, it is desirable to detect whether the head contacts the disk (touchdown) so that protective action can be taken, such as recalibrating the fly height control.

BRIEF DESCRIPTION OF THE DRAWINGS

FIG. 6 shows source code for implementing the flow diagram of FIG. 5 according to an embodiment of the present invention.

DETAILED DESCRIPTION OF EMBODIMENTS OF THE INVENTION

Figure 2A:
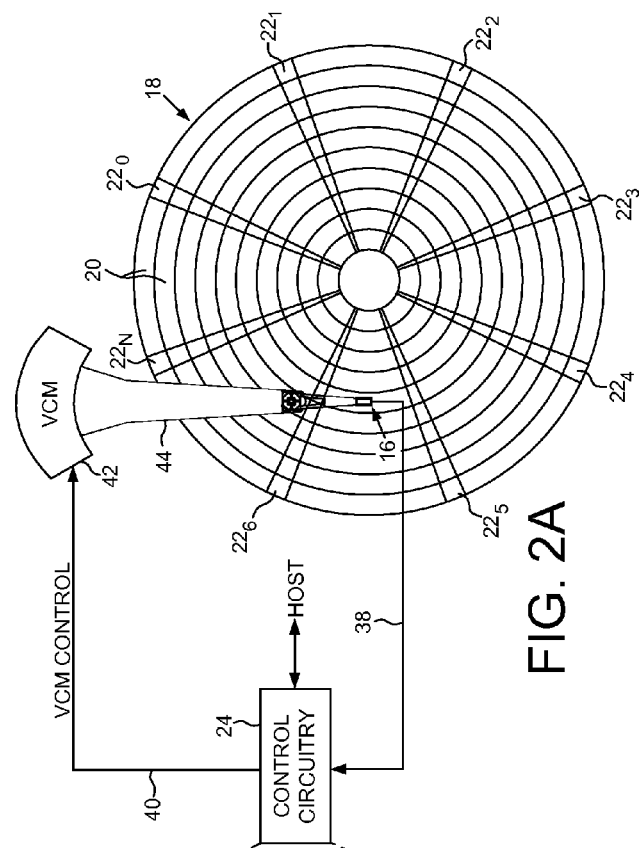
FIG. 2A shows a disk drive according to an embodiment of the present invention comprising a head actuated over a disk and control circuitry.

FIG. 2A shows a disk drive according to an embodiment of the present invention comprising a head 16 actuated over a disk 18 comprising a plurality of tracks 20, wherein each track comprises a plurality of servo sectors $22_0$-$22_N$. The disk drive further comprises control circuitry 24 for executing the flow diagram of FIG. 2B, wherein the head is positioned over a first track (step 26), and when a first servo sector of the first track is processed (step 28) a first touchdown metric (step 30) is evaluated (step 32) to detect whether the head contacted the disk (step 34) without evaluating a second touchdown metric. When a second servo sector of the first track is processed (step 28), the second touchdown metric (step 30) is evaluated (step 32) to detect whether the head contacted the disk (step 34) without evaluating the first touchdown metric.

Figure 1:
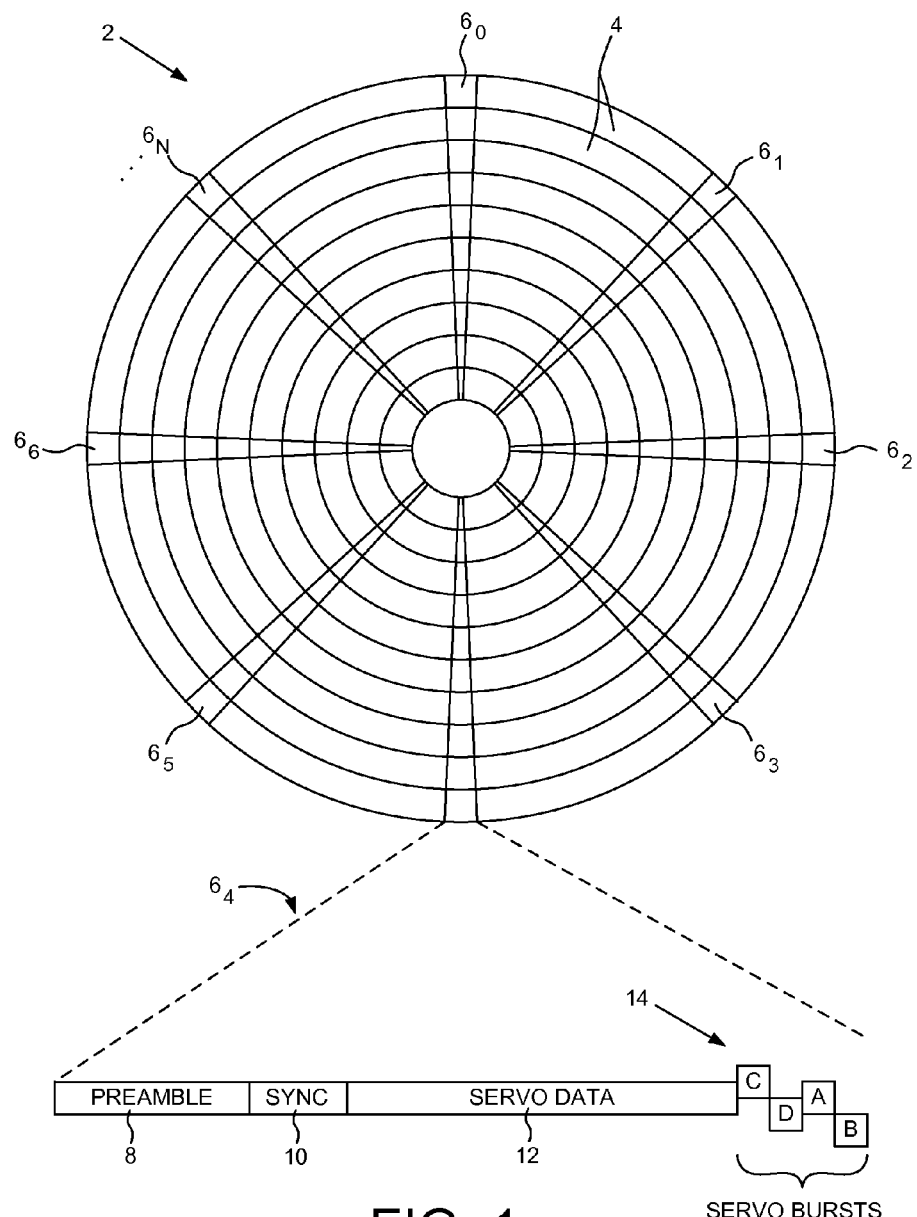
FIG. 1 shows a prior art disk format comprising a plurality of data tracks defined by embedded servo sectors.

In the embodiment of FIG. 2A, the control circuitry 24 processes a read signal 38 emanating from the head 16 to demodulate the servo sectors $22_0$-$22_N$ into a position error signal (PES). The PES is filtered with a suitable compensation filter to generate a control signal 40 applied to the VCM 42 which rotates an actuator arm 44 about a pivot in order to position the head 16 radially over the disk 18 in a direction that reduces the PES. The servo sectors $22_0$-$22_N$ may comprise any suitable position information, such as a track address for coarse positioning and servo bursts for fine positioning as described above with reference to FIG. 1.

Figure 2B:
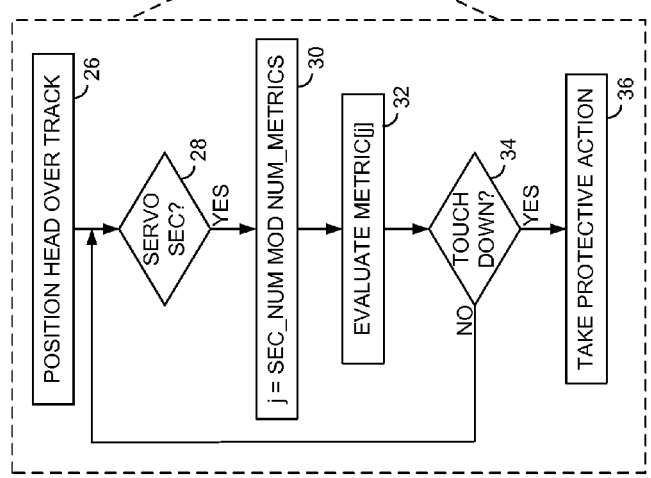
FIG. 2B is a flow diagram according to an embodiment of the present invention wherein a subset of touchdown metrics are evaluated while processing each servo sector to detect whether the head has contacted the disk.
Figure 2C:
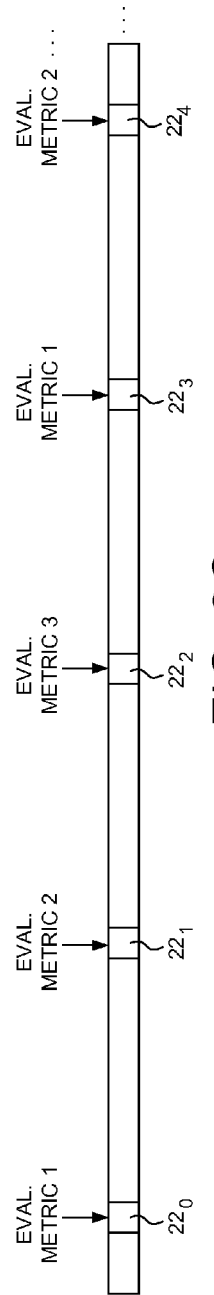
FIG. 2C shows an embodiment of the present invention wherein the touchdown metric is rotated when processing consecutive servo sectors.

An embodiment of the present invention is illustrated in FIG. 2C which shows a track comprising a plurality of consecutive servo sectors $22_0$-$22_4$. As the head 16 passes over each servo sector, a different touchdown metric is evaluated, and when the last touchdown metric has been evaluated, the process repeats starting with the first touchdown metric. In the embodiment shown in FIG. 2B, three touchdown metrics are evaluated (one per servo sector); however, any suitable number of touchdown metrics may be evaluated. In addition, any suitable kind of touchdown metric may be generated that gives an indication as to whether the head has contacted the disk. Examples of suitable touchdown metrics are described below with reference to FIG. 6 and may include a metric generated from a position error signal, a metric generated from the servo burst signals, and a metric generated from a wedge-to-wedge timing.

In one embodiment, each touchdown metric may be more sensitive depending on various attributes of the disk drive, such as the geometry of the head and/or the cause of the touchdown. For example, the position error signal may be more sensitive to lateral bearing modes of a spindle motor (not shown) that rotates the disk, the amplitude of the servo burst signals may be sensitive to vertical oscillations of the disk, and the wedge-to-wedge timing may be sensitive to down-track changes.

In an embodiment of the present invention, the touchdown metrics are evaluated during a servo sector interrupt responsible for generating the servo control signals for positioning the head and may have a limited amount of processing time available to evaluate the touchdown metrics. Accordingly, in order to accommodate the limited servo sector processing time, not all of the touchdown metrics are evaluated at each servo sector in order to determine whether the head has contacted the disk. Instead, only a subset of the touchdown metrics (e.g., one touchdown metric in the example of FIG. 2C) are evaluated during the servo sector interrupt in order to determine whether the head has contacted the disk. The touchdown metric(s) evaluated changes as each servo sector is processed so that all of the touchdown metrics are eventually evaluated.

In the embodiment of FIG. 2B when a touchdown is detected (step 34) the control circuitry takes any suitable protective action (step 36). In one embodiment, the control circuitry may park the head on a ramp (not shown) if the touchdown is estimated to have been caused by a transient condition, such as a physical shock to the disk drive. In another embodiment, the control circuitry may refresh a fly height calibration track and then recalibrate the fly height control in order to reset the operating fly height of the head.

Figure 3:
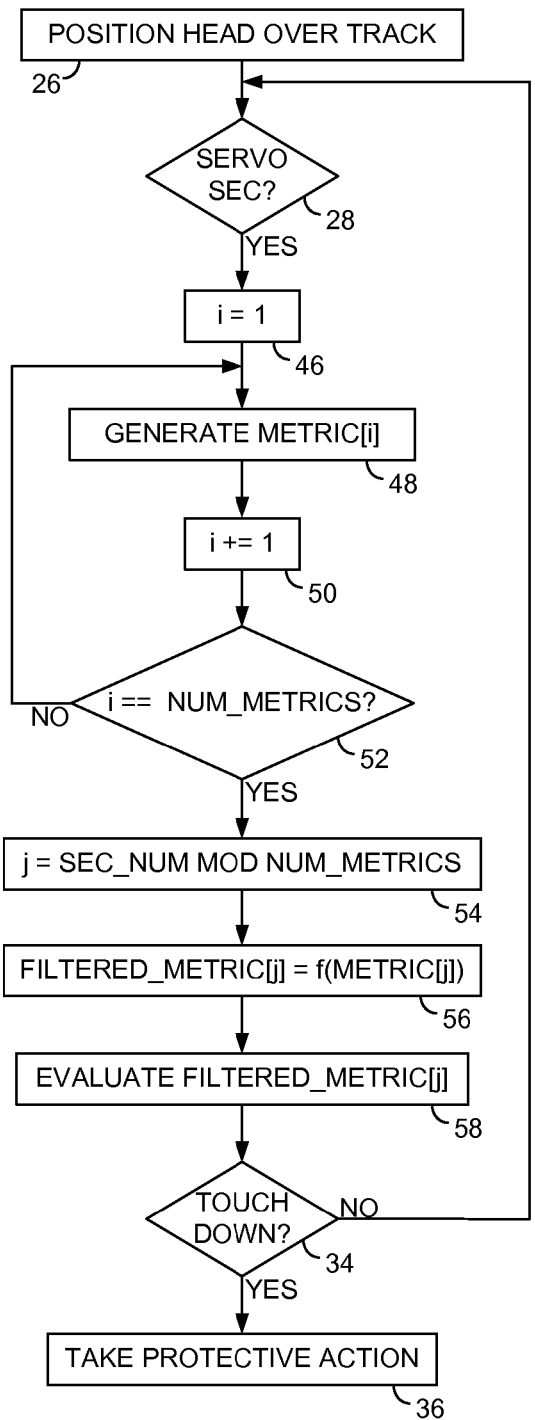
FIG. 3 is a flow diagram according to an embodiment of the present invention wherein all of the touchdown metrics are generated when processing a servo sector, but only of the touchdown metrics is evaluated to detect whether the head has contacted the disk.

In an embodiment shown in the flow diagram of FIG. 3, all of the touchdown metrics are generated when processing a servo sector, but only one of the metrics is evaluated during the servo sector interrupt to detect whether the head has contacted the disk. Accordingly, during the servo sector interrupt an index i is initialed to one (step 46), a touchdown metric sub i is then generated (step 48). The index i is incremented (step 50) and the process repeated until all of the metrics have been generated (step 52). An index j is initialized to the current sector number modulo divided by the number of touchdown metrics (step 54). The touchdown metric sub j is optionally filtered such as with a low pass filter (step 56), and the filtered touchdown metric sub j is evaluated (step 58) to detect whether the head contacted the disk (step 34). In an alternative embodiment, a subset (more than one) of the touchdown metrics may be filtered and evaluated during the servo sector interrupt to detect whether touchdown occurred.

Figure 4:
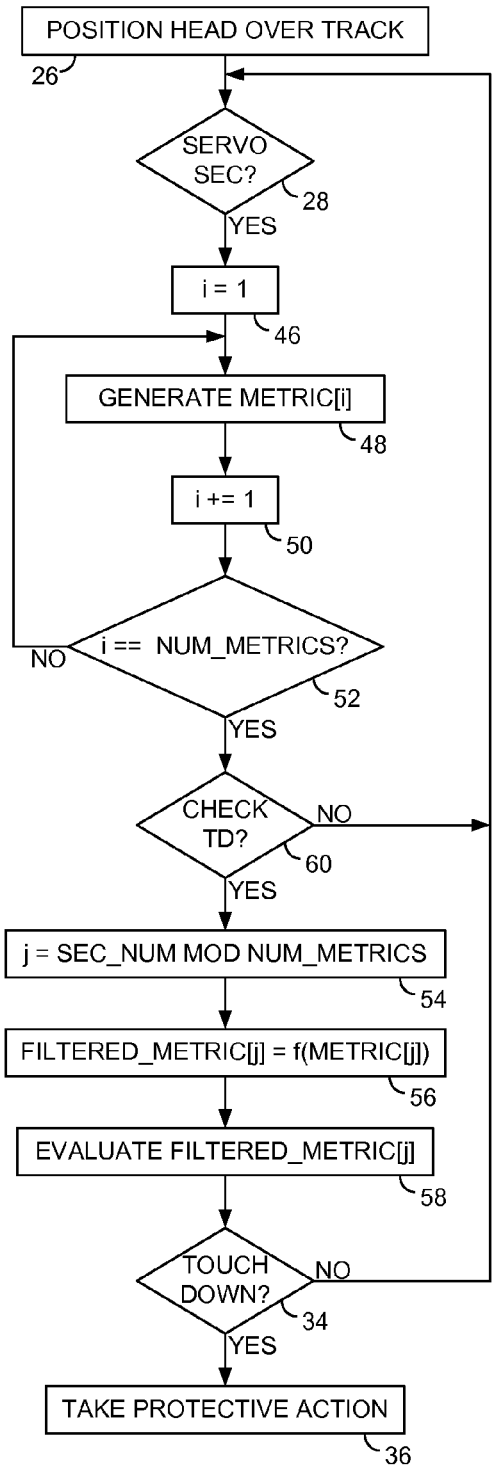
FIG. 4 is a flow diagram according to an embodiment of the present invention wherein all of the touchdown metrics are generated when processing a servo sector, but a touchdown metric may not be evaluated to determine whether the head has contacted the disk (e.g., during a seek).

In an embodiment shown in the flow diagram of FIG. 4, the control circuitry may disable the filtering and evaluating of the touchdown metric during the servo sector interrupt. For example, the control circuitry may disable the detection of touchdown for a servo sector during a seek operation (while reading tracks other than the target track), while still generating the touchdown metrics during the seek operation. Evaluating the touchdown metrics to detect touchdown may then be enabled when the head approaches the target track during a settle mode and while tracking the target track. In the flow diagram of FIG. 4, this aspect is implemented by evaluating a flag (step 60) to determine whether a touchdown metric should be filtered and evaluated during the servo sector interrupt.

Figure 5:
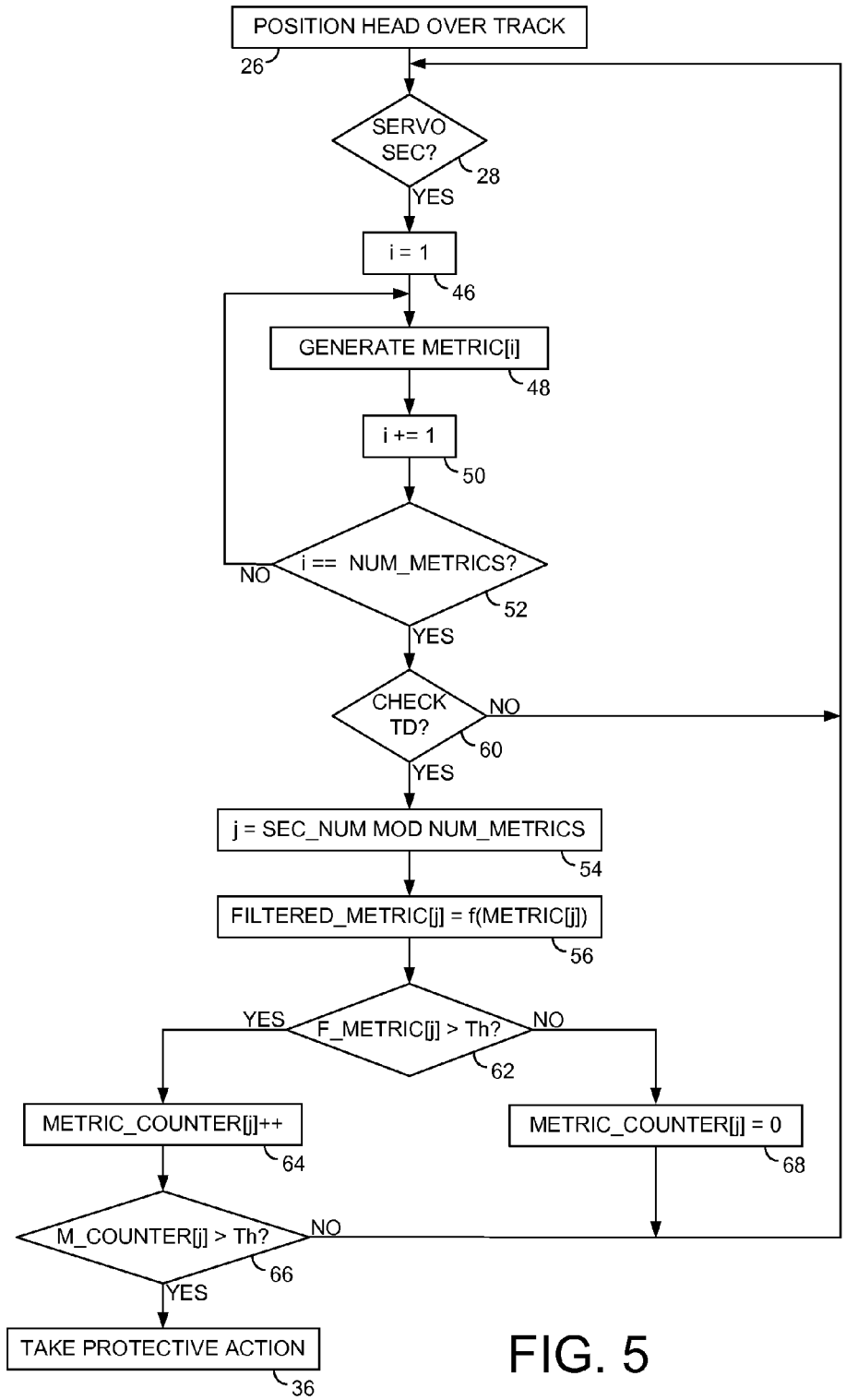
FIG. 5 is a flow diagram according to an embodiment of the present invention wherein the touchdown is detected if one of the touchdown metrics exceeds a threshold a predetermined number of times.

FIG. 5 is a flow diagram according to an embodiment of the present invention wherein the filtered touchdown metric sub j is compared to a threshold (step 62). If the filtered touchdown metric sub j exceeds the threshold, a corresponding metric counter sub j is incremented (step 64). If the metric counter sub j exceeds a threshold (step 66), a touchdown is detected and the control circuitry takes protective action (step 36). Accordingly, touchdown is detected in this embodiment when a consecutive number of one of the touchdown metrics exceeds a threshold. If one of the touchdown metrics does not exceed the threshold (step 62) prior to detecting touchdown, then its corresponding metric counter is reset (step 68). This embodiment may help reduce the number of false touchdowns detected.

FIG. 6 shows source code according to an embodiment of the present invention for implementing the flow diagram of FIG. 5. In the embodiment of FIG. 6, three touchdown metrics are generated during a servo sector interrupt, and one of the touchdown metrics is filtered and evaluated to detect touchdown (when touchdown detection is enabled). The three touchdown metrics include: a first metric generated from a position error signal (PES), where the PES is generated from the position information recorded in the servo sectors as described above; a second metric generated from a sum of the servo burst signals (e.g., sum of the integrated signals while reading A,B,C,D servo bursts); and a third metric generated from a wedge-to-wedge timing representing the time measured between consecutive servo sectors. However, any suitable number of touchdown metrics may be generated in any suitable manner.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
    a disk comprising a plurality of tracks, wherein each track comprises a plurality of servo sectors;
    a head actuated over the disk; and
    control circuitry operable to:
        position the head over a first track;
        process a first servo sector of the first track and evaluate a first touchdown metric to detect whether the head contacted the disk without evaluating a second touchdown metric; and process a second servo sector of the first track and evaluate the second touchdown metric to detect whether the head contacted the disk without evaluating the first touchdown metric.

2. The disk drive as recited in claim 1, wherein the first and second servo sectors are consecutive.

3. The disk drive as recited in claim 1, wherein the control circuitry is further operable to filter a plurality of the first touchdown metrics and filter a plurality of the second touchdown metrics to detect whether the head contacted the disk.

4. The disk drive as recited in claim 3, wherein the control circuitry is further operable to:
generate the first and second touchdown metrics when processing the first servo sector; and
generate the first and second touchdown metrics when processing the second servo sector.

5. The disk drive as recited in claim 4, wherein the control circuitry is further operable to:
disable the filtering and evaluating of the first and second touchdown metrics when processing a plurality of servo sectors; and
generate the first and second touchdown metrics during the processing of the plurality of the servo sectors.

6. The disk drive as recited in claim 5, wherein a second track comprises at least one of the plurality of servo sectors.

7. The disk drive as recited in claim 1, wherein the control circuitry is further operable to:
generate the first and second touchdown metrics when processing the first servo sector; and
generate the first and second touchdown metrics when processing the second servo sector.

8. The disk drive as recited in claim 7, wherein the control circuitry is further operable to:
disable the evaluating of the first and second touchdown metrics when processing a plurality of servo sectors; and
generate the first and second touchdown metrics during the processing of the plurality of the servo sectors.

9. The disk drive as recited in claim 8, wherein a second track comprises at least one of the plurality of servo sectors.

10. The disk drive as recited in claim 1, wherein the control circuitry is further operable to:
compare the first touchdown metric to a threshold; and
detect that the head contacted the disk when a consecutive plurality of the first touchdown metric exceed the threshold.

11. A method of operating a disk drive, the disk drive comprising a head actuated over a disk comprising a plurality of tracks, wherein each track comprises a plurality of servo sectors, the method comprising:
positioning the head over a first track;
processing a first servo sector of the first track and evaluate a first touchdown metric to detect whether the head contacted the disk without evaluating a second touchdown metric; and
processing a second servo sector of the first track and evaluate the second touchdown metric to detect whether the head contacted the disk without evaluating the first touchdown metric.

12. The method as recited in claim 11, wherein the first and second servo sectors are consecutive.

13. The method as recited in claim 11, further comprising filtering a plurality of the first touchdown metrics and filtering a plurality of the second touchdown metrics to detect whether the head contacted the disk.

14. The method as recited in claim 13, further comprising:
generating the first and second touchdown metrics when processing the first servo sector; and
generating the first and second touchdown metrics when processing the second servo sector.

15. The method as recited in claim 14, further comprising:
disabling the filtering and evaluating of the first and second touchdown metrics when processing a plurality of servo sectors; and
generating the first and second touchdown metrics during the processing of the plurality of the servo sectors.

16. The method as recited in claim 15, wherein a second track comprises at least one of the plurality of servo sectors.

17. The method as recited in claim 11, further comprising:
generating the first and second touchdown metrics when processing the first servo sector; and
generating the first and second touchdown metrics when processing the second servo sector.

18. The method as recited in claim 17, further comprising:
disabling the evaluating of the first and second touchdown metrics when processing a plurality of servo sectors; and
generating the first and second touchdown metrics during the processing of the plurality of the servo sectors.

19. The method as recited in claim 18, wherein a second track comprises at least one of the plurality of servo sectors.

20. The method as recited in claim 11, further comprising:
comparing the first touchdown metric to a threshold; and
detecting that the head contacted the disk when a consecutive plurality of the first touchdown metric exceed the threshold.

* * * * *